(12) United States Patent
Ocampo (10) Patent No.: US 7,970,881 B2
(45) Date of Patent: Jun. 28, 2011

(54) BYPASSING UPLOADING OF DATA FROM A WIRELESS DEVICE USING OUTBOUND ATTACHMENT CACHING

(75) Inventor: Nestor Ocampo, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 12/070,637

(22) Filed: Feb. 19, 2008

(65) Prior Publication Data

US 2009/0210502 A1    Aug. 20, 2009

(51) Int. Cl.
*G06F 15/173* (2006.01)

(52) U.S. Cl. ......... 709/223; 709/203; 709/206; 709/224

(58) Field of Classification Search .................. 709/223, 709/224, 203, 206, 217, 218, 219
See application file for complete search history.

(56) References Cited

U.S. PATENT DOCUMENTS

| | | | |
|---|---|---|---|
| 5,802,312 A * | 9/1998 | Lazaridis et al. | 709/238 |
| 6,360,252 B1 * | 3/2002 | Rudy et al. | 709/206 |
| 6,598,076 B1 * | 7/2003 | Chang et al. | 709/206 |
| 6,721,804 B1 | 4/2004 | Rubin et al. | |
| 7,373,144 B1 * | 5/2008 | Kirkpatrick et al. | 455/421 |
| 7,376,702 B2 * | 5/2008 | DeSalvo et al. | 709/206 |
| 7,383,303 B1 * | 6/2008 | Bort | 709/206 |
| 7,499,996 B1 * | 3/2009 | Buchheit et al. | 709/224 |
| 7,567,542 B2 * | 7/2009 | Rybak et al. | 370/338 |
| 7,613,777 B2 * | 11/2009 | Giles et al. | 709/206 |
| 7,809,356 B2 * | 10/2010 | Bumiller | 455/412.1 |
| 2002/0016818 A1 * | 2/2002 | Kirani et al. | 709/203 |
| 2003/0028647 A1 * | 2/2003 | Grosu | 709/227 |
| 2003/0095550 A1 * | 5/2003 | Lewis et al. | 370/392 |
| 2003/0105825 A1 * | 6/2003 | Kring et al. | 709/206 |
| 2005/0076087 A1 * | 4/2005 | Budd et al. | 709/206 |
| 2007/0266107 A1 * | 11/2007 | Friend et al. | 709/206 |
| 2008/0270547 A1 * | 10/2008 | Glickstien et al. | 709/206 |
| 2008/0270548 A1 * | 10/2008 | Glickstein et al. | 709/206 |
| 2009/0204721 A1 * | 8/2009 | Yost et al. | 709/232 |
| 2010/0011077 A1 * | 1/2010 | Shkolnikov et al. | 709/206 |
| 2010/0332620 A1 * | 12/2010 | Bumiller | 709/219 |

* cited by examiner

*Primary Examiner* — Lashonda T Jacobs (57) ABSTRACT

A method comprising: storing outbound attachments uploaded from a wireless device in a cache memory of a wireless service; receiving, over the wireless network, an electronic message that includes an attachment from a wireless device; determining whether the attachment is stored within the cache memory; and sending the electronic message to one or more addressees based on the determining.

32 Claims, 6 Drawing Sheets

BYPASSING UPLOADING OF DATA FROM A WIRELESS DEVICE USING OUTBOUND ATTACHMENT CACHING

TECHNICAL FIELD

This application relates generally to the field of data processing systems and more particularly to bypassing uploading of attachments that have been previously uploaded from a wireless device over a wireless network.

BACKGROUND

E-mail ("email") has become an irreplaceable tool in today's business environment. Virtually all corporate employees rely on email in one way or another to communicate both externally with customers and internally with other employees. Email access may be provided by a user's Internet Service Provider (e.g., Pacific Bell, AT&T WorldNet™, America Online™, . . . etc), or by an Internet website (e.g., Yahoo™ Mail or Hotmail™). The average email consists of a message body, header, and, optionally, one or more attachments. The message body is created using an email application which provides a window for entering text. The header is used by the Internet service to direct the routing of the message and also to communicate certain user-specific information (e.g. access rights, authentication, etc.). The message body and header are small in size, typically on the order of 5 kilobytes (kb) or so, and require a low amount of network bandwidth utilization for transmission.

Email may also include one or more file attachments which are used for sending data stored on a user's computer or other electronic device. Attachments can include file types such as computer data, applications, graphics, text documents, and etc. Email attachments are appended to an outgoing email message so that the content of the one or more attachments can be distributed to one or more intended addressees. Email is a preferred method of distributing attachments that more than one person needs access to; however, the present invention is not so limited. Attachments may be appended to various other electronic messages including instant messages. Unlike the email message body and header, attachments are large in size, typically 500 kb and upwards. Attachments include files such as pictures, video clips, and audio streams, which require a large amount of bandwidth for transmission over a network.

In addition, a growing number of email users rely on portable, multi-purpose data processing devices such as Personal Digital Assistants (PDAs) which include both electronic messaging and personal information management (PIM) capabilities. As a result, portable data processing devices such as and programmable wireless telephones are becoming more powerful every day, providing users with a wide range of applications previously only available on personal computers. One limitation of current multi-purpose telephony and/or data processing devices such as PDAs is that they utilize a wireless network to communicate with a service provider. It is well-known that wireless networks have limited bandwidth which comes at a premium. Wireless service providers, for example, are required to pay per megabit for bandwidth utilization as well pay for data storage. As a result, there is a need for new methods to reduce bandwidth utilization and data storage requirements in wireless networks. In prior art wireless messaging systems; however, the message body, header and attachment(s) must be uploaded every time an email message is sent over the network. Thus, bandwidth must be used to send the attachment(s) every time an email message is sent whether or not the same attachment(s) is sent more than once. This creates a problem for wireless networks since wireless devices today have significant network bandwidth limitations.

A solution to reducing bandwidth utilization for sending and receiving email messages is to bypass uploading unnecessary attachments whenever possible since the attachment requires much more bandwidth than the message body and header. One way to accomplish this is to store a user's previously uploaded attachments at the wireless service. Thus, if previously uploaded attachments are stored at the service, they do not have to be uploaded again whenever another message containing the same attachment is subsequently sent across the network.

SUMMARY

A method implemented on a data processing device is described where outbound attachments associated with an electronic message uploaded from a wireless device are stored into a cache memory located at the wireless service for possible subsequent use. When the wireless service receives electronic messages that include one or more attachments from wireless devices, it determines whether the attachment(s) are stored in the service cache memory. The wireless service then sends out the electronic messages to one or more intended addressees with the attachment(s), where the attachment(s) is either retrieved from the cache memory if it is stored there or uploaded from the wireless device if not.

BRIEF DESCRIPTION OF THE DRAWINGS

A better understanding of bypassing uploading of data from a wireless device using outbound attachment caching can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
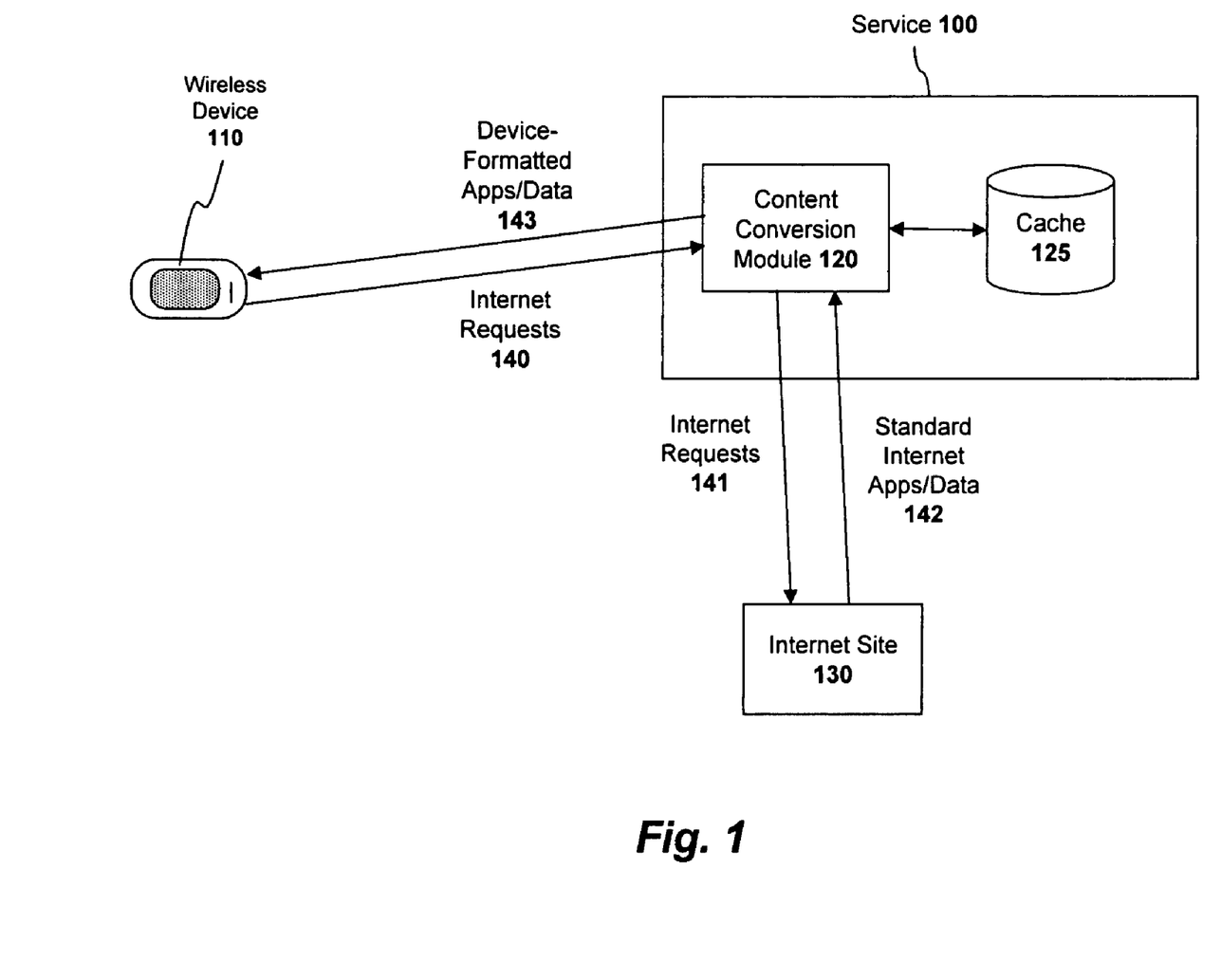
FIG. 1 illustrates a wireless service communicating with a wireless data processing device according to one embodiment of the invention.

Embodiments of the invention may be implemented on a wireless device 110 which communicates with a data processing service 100 as illustrated generally in FIG. 1. Embodiments of a service 100 and data processing device 110 are described in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 and an exemplary data processing device 110 will now be described followed by a detailed description of a system and method for bypassing uploading of data from a wireless device using outbound attachment caching. As an initial matter, however, it should be noted that the specific data processing device and system architecture described in U.S. Pat. No. 6,721,804 are not required for implementing the underlying principles of the invention. Rather, the embodiments of the invention described below may be implemented on virtually any type of data processing device including standard personal computers, personal digital assistants and wireless telephones.

In one embodiment, the service 100 converts standard applications and data into a format which each data processing device 110 can properly interpret. Thus, as illustrated in FIG. 1, one embodiment of the service 110 includes content conversion logic 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., web pages with embedded audio/video and graphical content, e-mail messages with attachments, . . . etc), and converting the standard Internet responses 124 into a format which the data processing device 110 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 110. As described above, in one embodiment, the bytecodes may be Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

Figure 2:
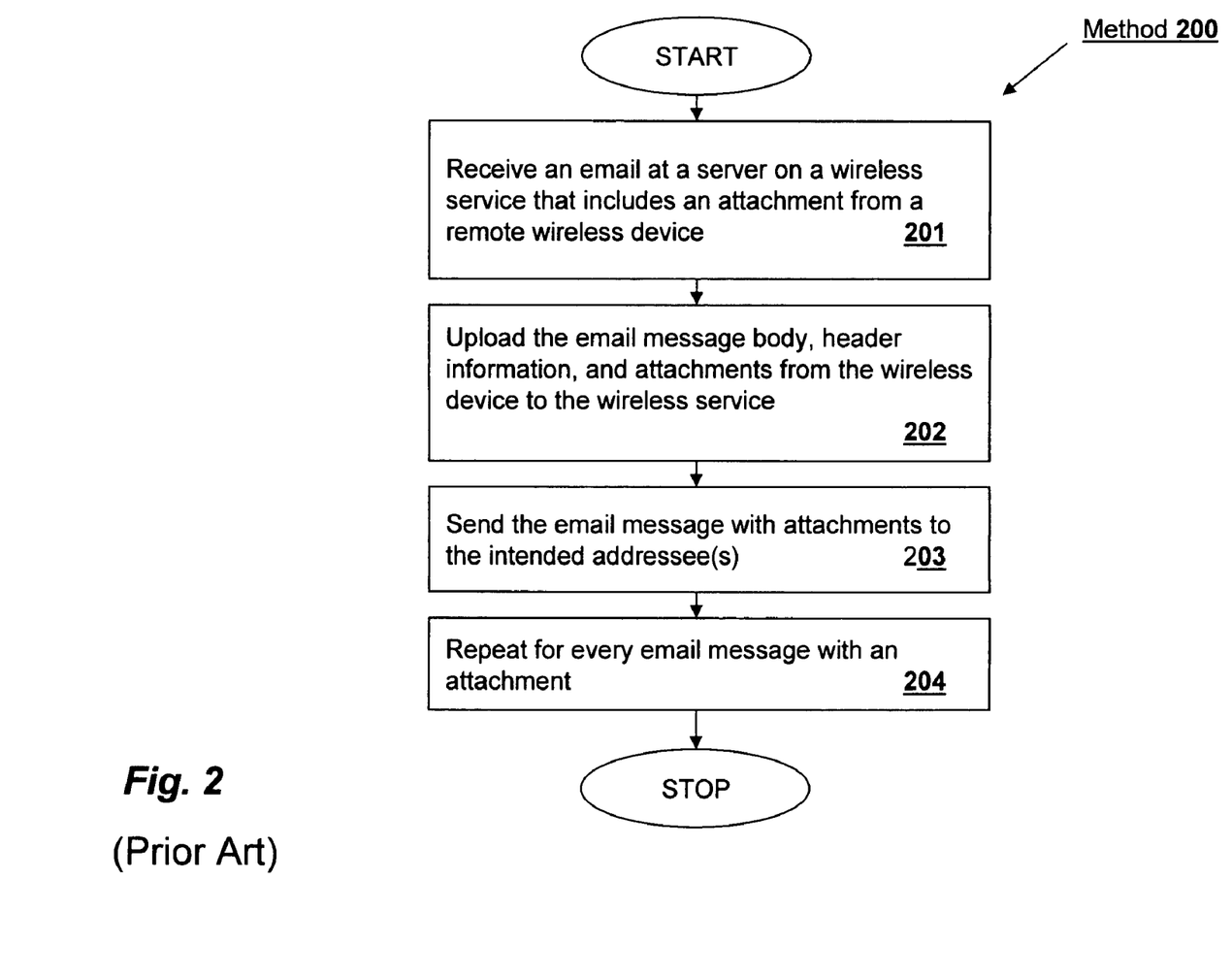
FIG. 2 illustrates a prior art method of sending attachments by way of email messaging over a wireless service.

Refer now to FIG. 2, which illustrates a prior art method of sending emails across a wireless network from a remote wireless device. In method 200 and email is received at a server on a wireless service that includes an attachment from a wireless device at step 201. The attachment may be stored at various locations including on the device itself, on an expandable memory card inserted into the device, or other storages platforms known in the art. The email message is then uploaded in step 202. An email message includes a message body and header. An email message may also include one or more attachments. At step 202, the email message body, header and attachment(s) are uploaded from the wireless device to the wireless service over a wireless network. At step 203, the email message which has been uploaded with attachments to the wireless service is sent to one or more intended addressees. The method 200, repeats for every email message with an attachment at step 204.

Figure 3:
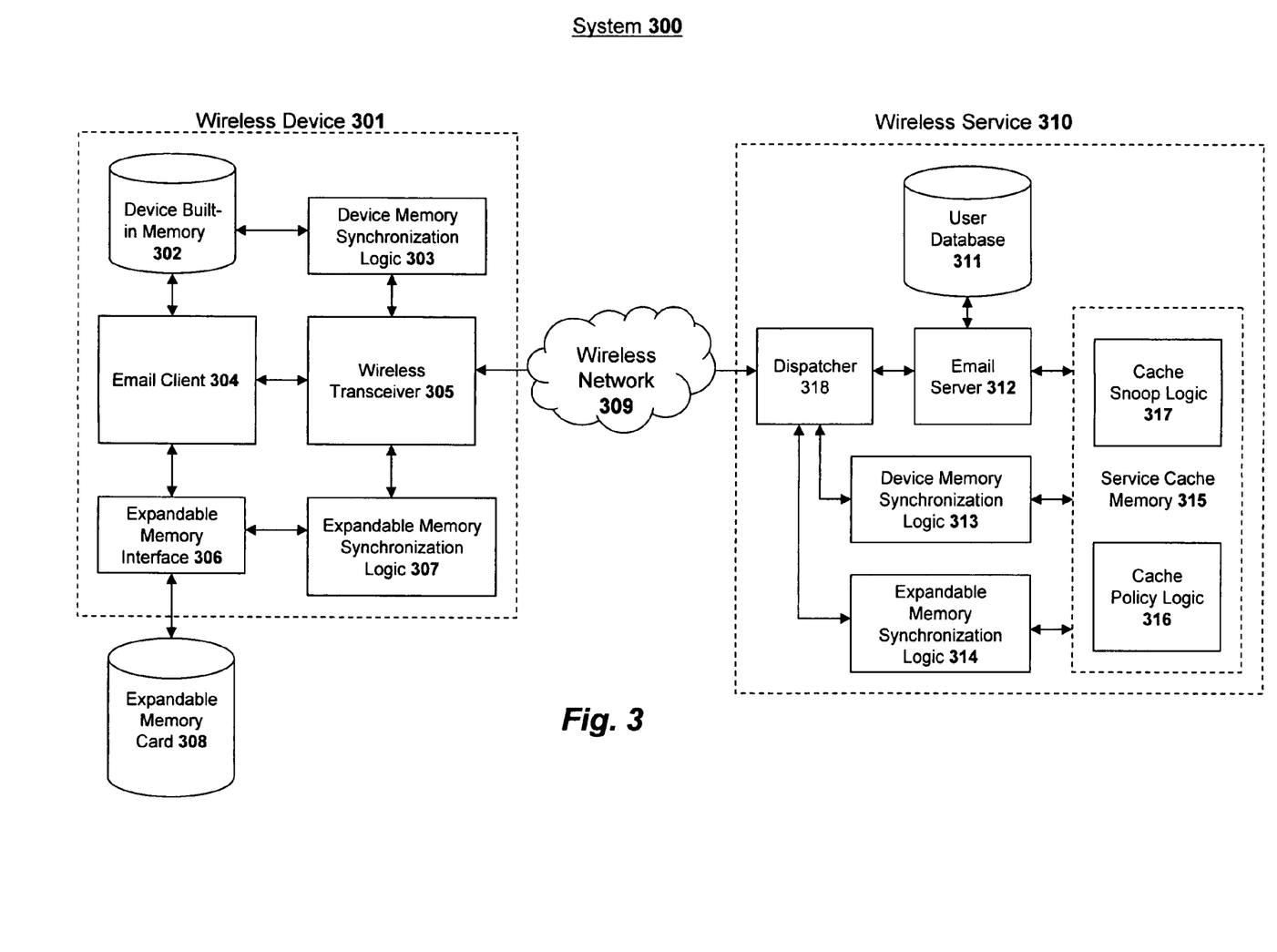
FIG. 3 illustrates a wireless service communicating with a remote wireless device according to one embodiment of the invention.

Refer now to FIG. 3, which illustrates one embodiment of the present invention. System 300 includes a wireless device 301 connected across a wireless network 309 to a wireless service 310. Wireless device 301 includes device nonvolatile memory 302, device memory synchronization logic 303, email client 304, wireless transceiver 305, expandable memory interface 306, expandable memory synchronization logic 307, and expandable memory card 308. Wireless service 310 includes dispatcher 318, email server 312, user database 311, device memory synchronization logic 313, expandable memory synchronization logic 314, and service cache memory 315. Service cache memory 315 further includes cache snoop logic 317 and cache policy logic 316.

Wireless device 301 communicates with wireless service 310 via wireless transceiver 305 over wireless network 309. Specifically, wireless transceiver 305 sends electronic messages including a message body, header information, and optionally, one or more attachments (not pictured) over wireless network 301 to wireless messaging service 310. Attachments stored on the wireless device 301 may be stored in one or more memory locations and include file types, such as, pictures, video, PDFs, word files, as well as other file types known in the art to be amenable to electronic transmission. In one embodiment, communications between wireless device 301 and wireless service 310 includes the use of protocols including, for example, the inclusion of information in the message header that indicates network-specific information. Alternatively, communications between wireless device 301 and wireless service 310 may be accomplished by modifying the protocol that is used between wireless device 301 and wireless service 310. However, the invention is not so limited and any protocol or set of protocols known in the art for communicating between wireless device 301 and wireless service 310 may be utilized for implementing the embodiments of the invention discussed below. In any case, email server 312 is instructed to check service cache memory 315 for certain data and files to be discussed below.

In one embodiment, data can be stored in one of several locations on wireless device 301. For example, attachments can be stored on the device itself in built-in memory, such as device built-in memory 302 which can include nonvolatile memory (e.g., flash memory). Alternatively, data can be stored on an expandable memory such as Secure Digital (SD) cards, microSD cards, ISK3, or other such expandable memory platforms known in the art.

In one embodiment, a user can choose where to store a specific attachment on wireless device 301 including, for example, the built-in memory 302 or the expandable memory card 308. For example, a user may configure a camera/photo application to automatically store captured photos on either the built-in memory 302 or the expandable memory card 308 inserted into wireless device 301 via expandable memory interface 306. Additionally, in other embodiments, the user can move pictures or other data stored on device built-in memory 302 onto expandable memory card 308 and visa versa.

Wireless device 301 also includes synchronization logic 303 and 307 coupled to device built-in memory 302 and expandable memory interface 306, respectively. In one embodiment, all data stored on the device's built-in memory 302 is periodically uploaded to service 310 and stored in cache memory 315. Device memory synchronization logic 303 performs this task automatically without user intervention as a part of the service provided to users of wireless device 301. If a user deletes data from the device 301, then device memory synchronization logic 303 detects the deletion and sends a signal via transceiver 305 over wireless network 301 indicating to the device memory synchronization logic 313 that the corresponding files are to be deleted from cache memory 315. Likewise, every time a picture or other data is saved on the device's built-in memory 302, it is automatically uploaded to the service 310 and stored in cache memory 315 via communication between the device memory synchronization logic 303 and 313 on the device and service, respectively. In one embodiment, each time the user attempts to transmit an email (or other type of electronic message) containing an attachment, the device memory synchronization logic 303 or 307 determines if the attachment is already stored on the service and communicates this information to the email client 304 (or other email processing logic (not shown)). When an electronic message is sent with an attachment from device's built-in memory 302, the message body and header are transmitted to the email server 312, but any attachment(s) are not uploaded to email server 312 from wireless device 310 because they are already stored in cache memory 315. Email server 312 then retrieves the data associated with the attachment from cache memory 315 and sends the attachment along with the message body and header to the intended addressees. In this way, only the message body and header need to be transmitted to wireless service 310 decreasing the bandwidth utilization of the wireless network 309.

Figure 4:
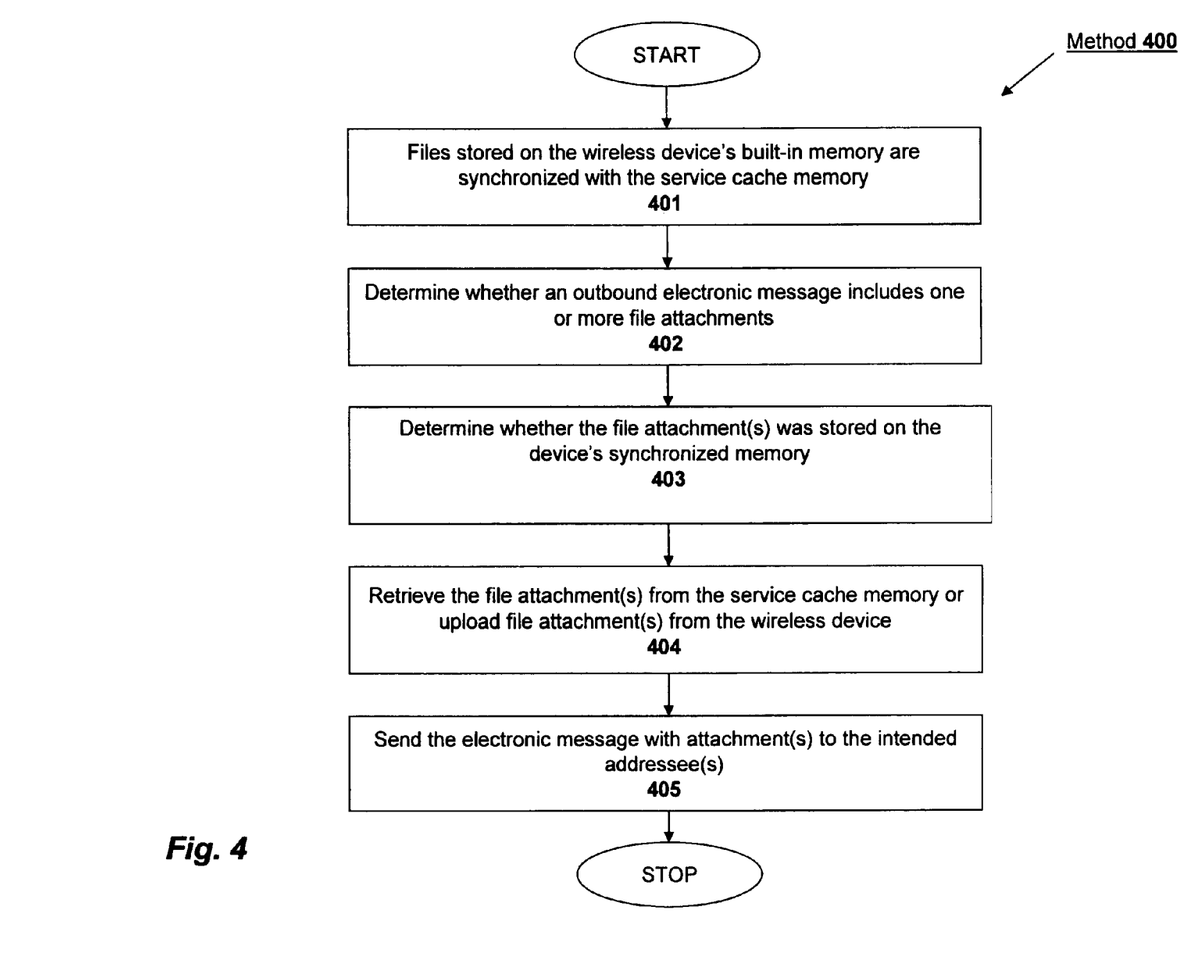
FIG. 4 illustrates a method of sending electronic messages according to one embodiment of the invention.

The above process is illustrated with reference to method 400 illustrated in FIG. 4. At step 401, files or other data stored on wireless device 301, are synchronized with wireless service 310 using device memory synchronization logic 303. In one embodiment, this is accomplished by copying files stored in built-in memory 302 into cache memory 315 at predetermined time intervals. Alternatively, synchronization may occur dynamically, each time users make changes to the data stored in the built-in memory 302.

At step 402, a determination is made as to whether an outbound electronic message includes one or more file attachments. In one embodiment, this is accomplished by a communication sent from wireless device 301 to email server 312 indicating that an outbound electronic message includes one or more file attachments. The communication can be placed, for example, in the electronic message's header. In this case, email server 312 uploads the message header or the entire email message from the wireless device to determine if the message includes an attachment. In an alternative embodiment, this communication may be sent by other signals known in the art.

At step 403, a determination is made as to whether the data associated with the outbound attachment(s) is stored in cache memory 315. If the attachment originated from device built-in memory 302, then it will have been automatically copied into cache memory 315 at some earlier time based on synchronization step 401. In one embodiment, this determination may be made at the service cache memory 315. When an electronic message is sent, the message body and header information are uploaded to the wireless service. The message header may contain information identifying the file attachment(s). File attachment identification information may include, for example, filenames, a checksum of the files size, or any combination of filenames and checksums of the file size, or other file identifiers known in the art. Email server 312 inspects the header to find the attachment(s) identification information. Cache snoop logic 317 then examines the cache to determine whether the files are stored in service cache memory 315. In an alternative embodiment, the wireless device itself makes this determination. In this embodiment, wireless device 301 tracks outbound attachments and maintains a list of filenames (or other file identifiers discussed above) which are already stored in service cache memory 315 based on the cache management policy. In this embodiment, wireless device 301 does not transmit file attachments which are in the list and known to be stored in cache memory 315.

At step 404, the file attachment(s) is either retrieved from service cache memory 315, or uploaded from wireless device 301 depending on whether the attachment(s) was stored in cache memory 315. Finally, at step 405, the electronic message with the file attachment(s) is sent to one or more intended addressees.

However, if the data associated with the attachment(s) is not stored on device built-in memory 302, then it will only be stored in cache memory 315 if it was part of a previous outbound electronic message. That is, if the data was stored on expandable memory card 308 instead of in device built-in memory, it will only be stored in cache memory 315 if it was sent as an earlier attachment from wireless device 301 over wireless network 309. This is because expandable memory 308 is not synchronized with wireless service 310. All data stored on expandable memory card 308, therefore, will not be stored in service cache memory 315 unless it was sent as a previous outbound attachment.

Expandable memory synchronization logic 307 is coupled to expandable memory card 308 through expandable memory interface 306. Unlike device memory synchronization logic 303, however, expandable memory synchronization logic 307 works in a different way as discussed below. Data stored on expandable memory card 308 is not automatically stored in wireless service 310 or cache memory 315. Instead, outbound attachments originating from expandable memory card 308 are stored in service cache memory 315. Expandable memory synchronization logic 307 performs the task of notifying expandable memory synchronization logic 314 located in wireless service 310 whenever data is deleted from expandable memory card 308. That is, attachments that are sent from expandable memory card 308 and later deleted from expandable memory card 308 will cause expandable memory synchronization logic 307 to send a deletion list to wireless service 310 over wireless network 301. Expandable memory synchronization logic 314 receives the deletion list and notifies service cache memory 315 that the data associated with a previously sent attachment is now deleted on expandable memory card 308. Cache memory 315 using cache snoop logic 317 then locates the data and deletes the file from cache memory 315 accordingly. Cache snoop logic 317 performs this operation by comparing the identification information (not pictured) of the attachment(s) with the identification information of files stored in cache memory 315 and determines when there is a match.

Figure 5:
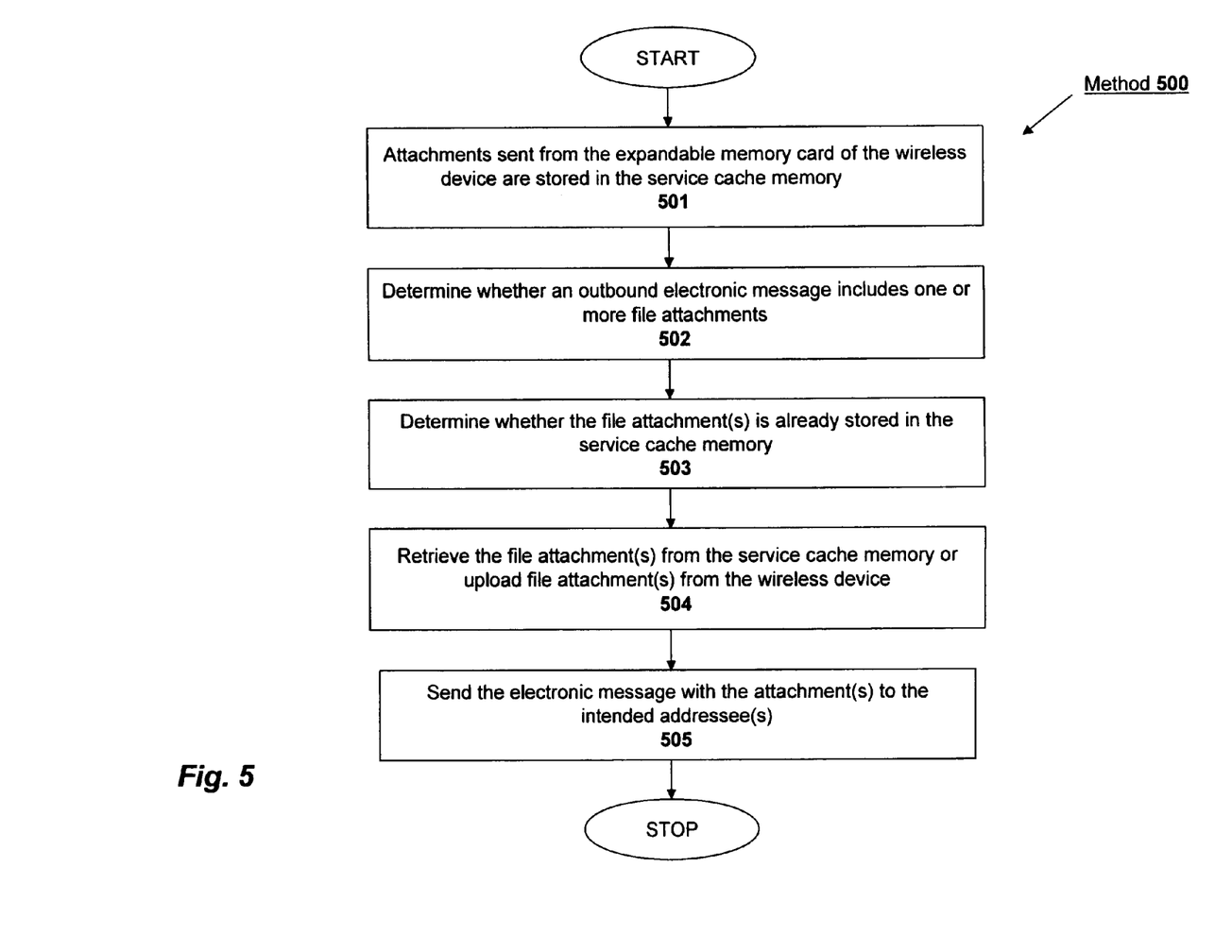
FIG. 5 illustrates a method of sending electronic messages according to one embodiment of the invention.

Sending a message from wireless device 301 with an attachment originating from expandable memory card 308 is detailed in method 500 of FIG. 5. At step 501, all received attachments are stored in service cache memory 315 whenever the attachment originated from expandable memory card 308 inserted in wireless device 301. At step 502, it is determined whether an outbound electronic message includes one or more file attachments. As discussed above, this can be accomplished in several ways including by placing this information in the message header. Once it is determined in step 503 that an outbound message includes one or more file attachments, the wireless service must further determine whether the attachment(s) is already stored in cache memory 315 using cache snoop logic 317. As discussed above, this determination can be made in several ways including by cache snoop logic 317. Cache snoop logic 317 compares the attachment identification information to the identification information of files stored in cache memory 315. If there is a match, then the attachment is already stored in cache memory 315. If cache snoop logic 317 does not detect a match, then the data associated with the attachment is not stored in cache memory 315. Alternatively, wireless device 301 can make this determination by checking the list of attachments previously sent from wireless device 301.

At step 504, the attachment is either uploaded from wireless device 301 or retrieved from cache memory 315 depending on whether the attachment is stored in cache memory 315. If the attachment(s) is already stored in service cache memory 315, then the attachment need not be uploaded from wireless device 301, but can be retrieved from cache memory 315. If attachment is not stored in cache memory 315, the attachment must be uploaded from wireless device 301 over wireless network 309. This completes step 504. In step 505, the appropriate files are attached to the outbound message and sent to the intended addressee(s).

In other embodiments, a cache management policy may be implemented. Cache policy logic 316 performs the function of determining when to delete data stored in cache memory 315 for a period of time. That is, cache policy logic 316 periodically updates the service cache memory 315 according to a predetermined cache update policy. The cache policy could be any one of several known in the art. For example, there could be a time-based expiration policy where data stored in cache memory 315 and that is unused for a period of time will be deleted after a period of time. Alternatively, cache policy logic 316 could implement a policy that maintains data in cache memory 315 as long as that attachment resides on expandable memory card 308 and the memory card 308 is inserted in wireless device 301. Additionally, there could be a cache policy based on how quickly the cache grows over time.

Figure 6:
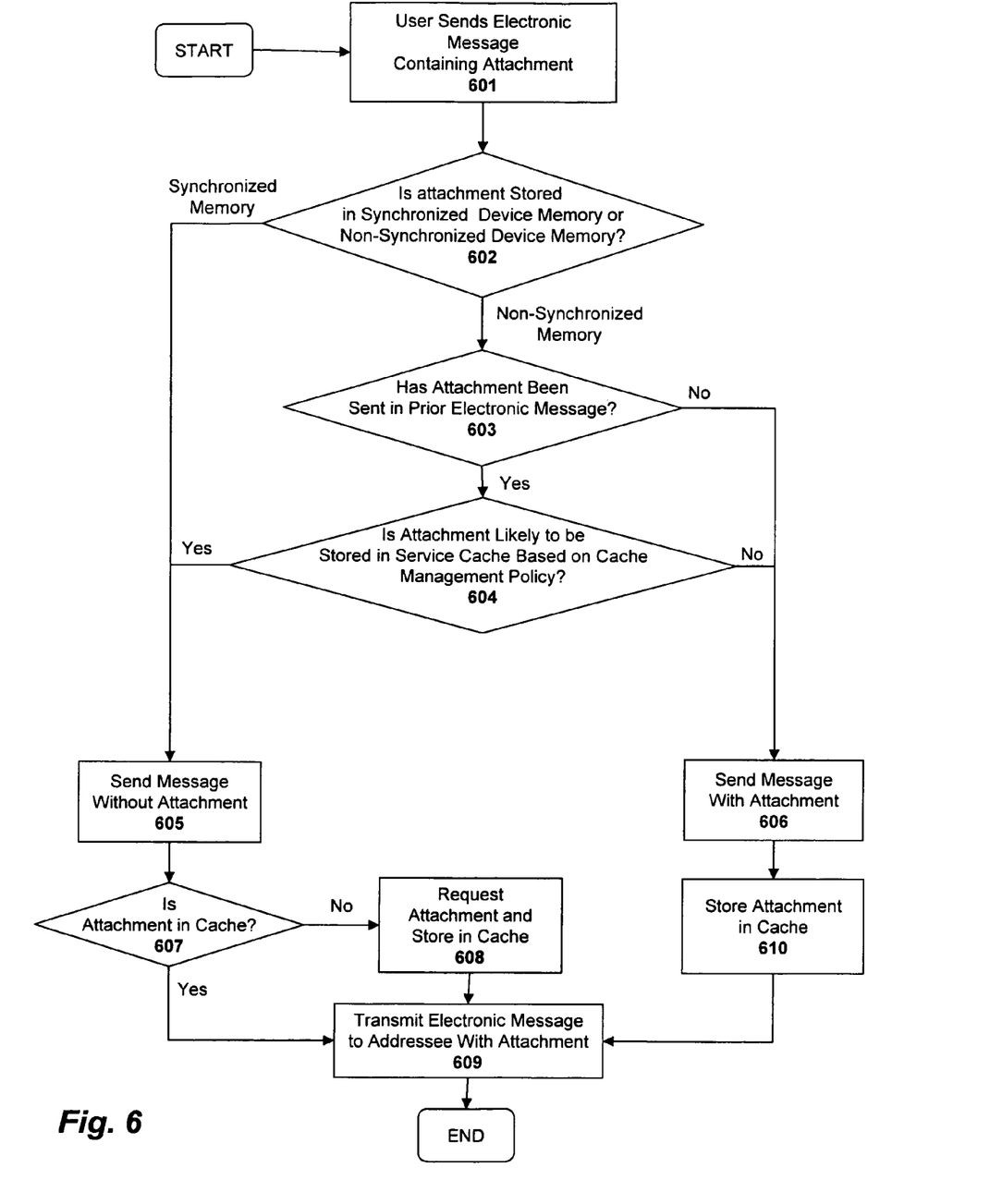
FIG. 6 illustrates a method of sending electronic messages according to one embodiment of the invention.

FIG. 6 another embodiment of the invention for sending electronic messages. At step 601 a user sends an electronic message containing one or more attachments from wireless device 301 over wireless network 309. At step 602, a determination is made as to whether the attachment was stored in a synchronized or non-synchronized memory included in wireless device 301. If the attachment was stored in the synchronized memory (i.e., device built-in memory 302), it will likely have been synchronized with (and therefore stored at) wireless service 310. In such a case, at step 605 the message is sent without the file attachment because the file attachment will likely be stored in service cache memory 315. At step 607, it is determined whether the file attachment was, in fact, stored in service cache memory 315. If the file attachment is stored in service cache 315, then it is retrieved and the electronic message with attachment is transmitted to one or more intended addressees at step 609. If the file attachment is not stored in service cache 315, then wireless server 312 requests the file attachment from wireless device 301 and the attachment is subsequently uploaded over the wireless network 309 and stored in cache memory 315 at step 608.

On the other hand, if the attachment was stored in the non-synchronized memory (e.g., expandable memory card 308), it will only be stored at the wireless service based on the determination at steps 603 and 604. At step 603, it is determined whether the file attachment has been sent in a previous electronic message. If so, the file attachment would have been stored in service cache memory 315 when the prior electronic message was sent. At step 604, it is determined whether the file attachment is likely to still be in service cache memory 315, or whether the file attachment has been subsequently deleted based on the cache management policy (discussed above). If so, the electronic message is sent without the file attachment at step 605. If the file attachment has been subsequently deleted from service cache 315 based on the cache management policy, then the electronic message is sent from wireless device 301 and the file attachment is uploaded over wireless network 309 at step 606. The file attachment is then stored in service cache memory 315 for possible use by another subsequent electronic message sent from wireless device 301. Finally, at step 609, the electronic message is transmitted with the file attached to one or more intended addressees.

Although some of the embodiments described above focus on caching email attachments, the underlying principles of the invention are not limited to any particular form of electronic messages. For example, in one embodiment of the invention electronic messages associated with social networking sites may also be used. In this embodiment, when a user transmits an electronic message to post a picture (or other type of file) to a social networking Website (or other type of Website), the caching mechanisms described above may be employed to reduce bandwidth.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above are limited to a wireless implementation, the underlying principles of the invention may be employed in a variety of different types of networks. Similarly, while the protocol stack described above is implemented using Java, the underlying principles of the invention are not limited to any particular programming language.

Accordingly, the scope and spirit of the invention should be judged in terms of the claims which follow.

What is claimed is:

1. A method implemented by a wireless device, the method comprising:
   determining, with synchronization logic executed by a processor of the wireless device, whether an attachment of an electronic message to be sent from the wireless device is stored in a first memory of the wireless device or a second memory of the wireless device, the first memory configured to automatically replicate data stored in the first memory to a wireless data service;
   sending the electronic message to the wireless data service without the attachment responsive to determining that the attachment is stored in the first memory;
   sending the electronic message to the wireless data service without the attachment responsive to determining that the attachment is stored in the second memory and that the attachment was previously sent to the wireless data service; and
   sending the electronic message to the wireless data service with the attachment responsive to determining that the attachment is stored in the second memory and that the attachment was not previously sent to the data service.

2. The method as in claim 1, wherein the first memory is built into the wireless device and the second memory is an expandable memory that is removable from the wireless device.

3. The method of claim 1, further comprising maintaining a list on the wireless device having identification information of previously sent file attachments, wherein the list indicates file attachments currently stored in a cache memory of the wireless data service.

4. The method of claim 3, wherein the identification information includes a file name and a checksum of file size.

5. The method of claim 1 wherein the electronic message comprises an email message.

6. The method of claim 1 wherein the electronic message is directed to a social networking site and the attachment comprises a file to be posted on the social networking site.

7. A method implemented by a server, the method comprising:
   receiving, at the server, an electronic message over a wireless network intended to include an attachment originating from an expandable memory inserted in a wireless device;
   determining whether the attachment is stored in a cache memory with a software program executed by a processor of the server;
   instructing the wireless device not to upload the attachment responsive to determining that the attachment is located in the cache memory;
   uploading the attachment from the wireless device responsive to determining that the attachment is not located in the cache memory; and
   sending the electronic message with the attachment either retrieved from the cache memory or uploaded from the wireless device.

8. The method of claim 7, wherein the determining comprises comparing identification information of the attachment with identification information of files currently stored in the cache memory.

9. The method of claim 8, wherein the identification information includes a file name and a checksum of file size.

10. The method of claim 7, wherein the electronic message may originate from the wireless device or from a different wireless device.

11. The method of claim 7, further comprising updating the cache memory periodically according to a cache update policy.

12. The method of claim 11, wherein the cache update policy includes a time-based expiration to delete unused data stored in the cache memory after a period of time.

13. The method of claim 11, wherein the cache update policy includes maintaining data stored in the cache memory for as long as the attachment is stored on the expandable memory and the expandable memory is inserted in the wireless device.

14. The method of claim 7, further comprising synchronizing content stored in a built-in memory of the wireless device with data stored in the cache memory by periodically copying the data from the built-in memory over the wireless network to the cache memory.

15. The method of claim 7, further comprising synchronizing data stored on the expandable memory with the cache memory, wherein data deleted from the expandable memory is also deleted from the cache memory.

16. The method of claim 7, wherein the electronic message comprises an email message.

17. The method of claim 7, wherein the electronic message is directed to a social networking site and the attachment comprises a file to be posted on the social networking site.

18. An apparatus comprising:
   a wireless service including:
      a dispatcher for sending and receiving electronic messages over a wireless network;
      a server coupled to the dispatcher to manage the electronic messages;
      a user database to store user data;
      a cache memory to store attachment data attached to the electronic messages originating from an expandable memory inserted in the wireless device; and
      a synchronization logic for maintaining the attachment data in the cache memory as long as corresponding data is stored on the expandable memory and the expandable memory is inserted in the wireless device.

19. The apparatus of claim 18, wherein the cache memory further comprises a cache snoop logic for determining whether the attachment data is currently stored within the cache memory.

20. The apparatus of claim 19, wherein the cache snoop logic compares identification information of the attachment data with identification information of files currently stored in the cache memory.

21. The apparatus of claim 20, wherein the identification information includes a file name and a checksum of file size.

22. The apparatus of claim 18, wherein the server sends electronic messages to one or more addressees with an attachment either retrieved from the cache memory or uploaded from the wireless device based on whether the attachment is stored within the cache memory.

23. The apparatus of claim 18, wherein the cache memory further comprises a cache policy logic to periodically update the cache memory according to a cache update policy.

24. The apparatus of claim 23, wherein the cache policy logic updates the cache memory based on an expiration policy to delete data stored in the cache memory after a period of time.

25. The apparatus of claim 18, further comprising a second synchronization logic to synchronize data stored in a built-in memory of the wireless device with the wireless service by periodically copying the data over the wireless network to the cache memory.

26. The apparatus of claim 18, wherein the electronic messages comprise email messages.

27. The apparatus of claim 18, wherein the electronic messages are directed to one or more social networking sites and the attachment data comprises a file to be posted on the social networking sites.

28. A system comprising:
a wireless network;
a wireless device comprising:
- a transceiver to send and receive information over the wireless network;
- an electronic messages client to manage electronic messages;
- a built-in memory to store information;
- an expandable memory to store data; and
- a first synchronization logic to notify the wireless service whenever data stored on the expandable memory is deleted; and a wireless service comprising:
- a dispatcher for sending and receiving the electronic messages over the wireless network;
- a user database to store user information;
- a server coupled to the dispatcher to manage the electronic messages;
- a cache memory to store attachment data attached to the electronic messages received from the expandable memory inserted in the wireless device; and
- a second synchronization logic for maintaining the attachment data in the cache memory as long as the attachment data is stored on the expandable memory and the expandable memory is inserted in the wireless device.

29. The system of claim 28, wherein the server sends electronic messages to one or more addressees with attachment data either retrieved from the cache memory or uploaded from the wireless device based on whether the attachment data is stored within the cache memory.

30. The system of claim 28, wherein the wireless device further comprises a list containing identification information of previously sent attachments, wherein the list indicates file attachments currently stored in the cache memory of the wireless service.

31. The system of claim 28, wherein the electronic messages comprise email messages.

32. The system of claim 28, wherein the electronic messages are directed to one or more social networking sites and the attachment data comprises a file to be posted on the social networking sites.

* * * * *